UNITED STATES PATENT OFFICE.

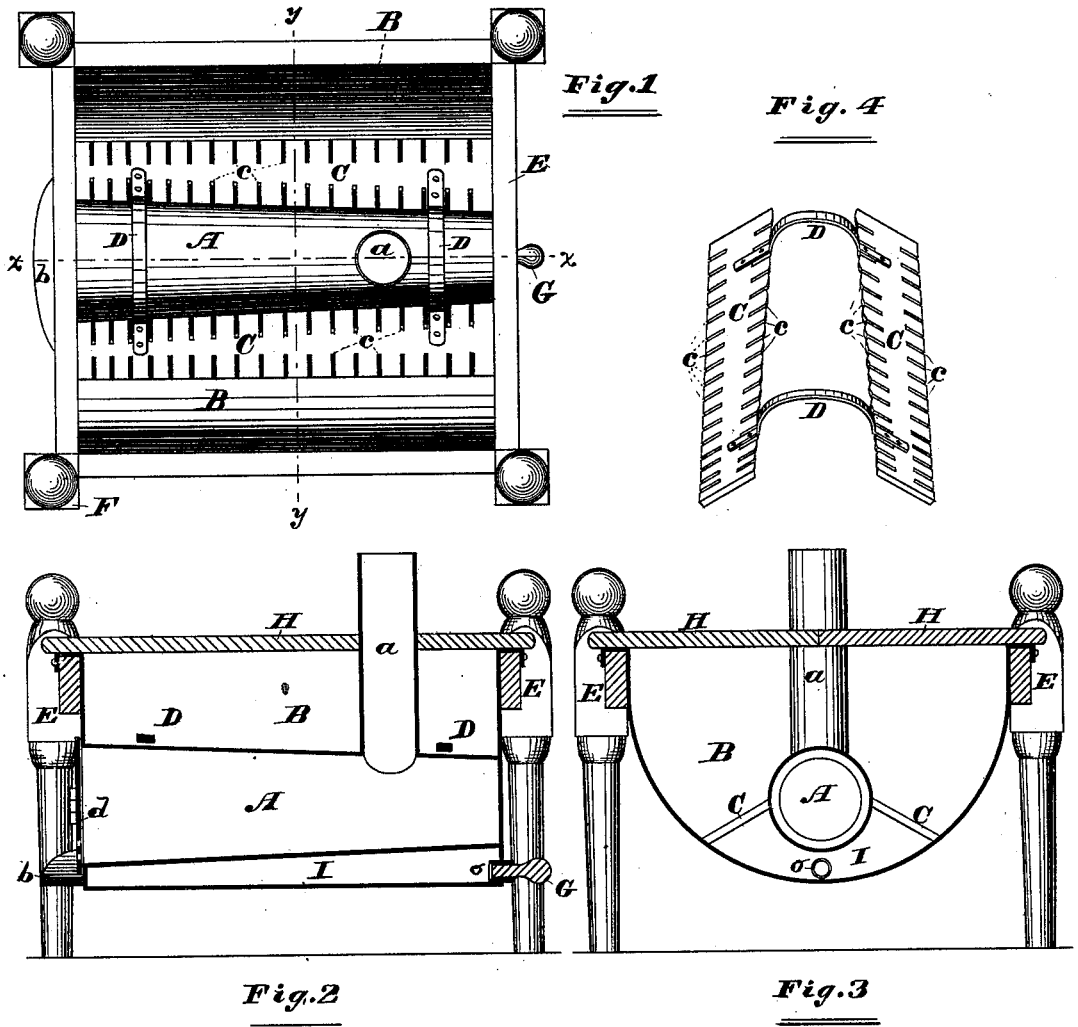

IVER E. BENDICKSON, OF CAMBRIDGE, WISCONSIN.

IMPROVEMENT IN FOOD-COOKERS.

Specification forming part of Letters Patent No. 208,560, dated October 1, 1878; application filed June 7, 1878.

*To all whom it may concern:*

Be it known that I, IVER E. BENDICKSON, of Cambridge, in the county of Dane and State of Wisconsin, have invented a Food-Cooker, of which the following is a specification:

The object of my invention is to cook food for stock rapidly and with the least possible expense; also, to provide means for removing the feed from the cooker without inconvenience as well as to separate the fluid from the substance cooked, all in the manner I now proceed to describe in detail.

Figure 1 is a plan view of my cooker with the cover H removed. The body B is for the reception of the feed to be cooked, and is composed of sheet metal, is of a semi-cylindrical form, as in Fig. 3, and is suspended upon a frame like that of a common table, composed of posts F and bars E. The upper edge of body B is turned over the upper edge of bars E and firmly secured to them, as in Figs. 2 and 3. Fig. 2 is a longitudinal section of Fig. 1, cut at dotted line $x\ x$, with cover H added.

A, Figs. 1, 2, and 3, is a tapering cylindrical fire-box, composed of sheet metal, placed horizontally in the body B, with its door $d$ and smoke-pipe $a$.

Fig. 3 represents a cross-section of Fig. 1, cut at dotted line $y\ y$. Fig. 4 represents a device for preventing the food or grain from falling below the fire-box, so as to occupy the space I.

The two angular slotted boards or plates C are coupled together by means of curved bars D, which, when in position, as in Figs. 1 and 2, rest upon fire-box A and hold the plates C in position, so as to close the space each side of the fire-box, as in Fig. 3. The slots $c$ will not allow solids to pass into the chamber I, while fluid will.

One purpose of this device is to make it more convenient to remove the food from the cooker by not allowing it to fill the space under the fire-box, and yet retain through the fluid all the benefit of the heating-surface for cooking.

Another purpose is to draw off the fluid through the passage $o$ by means of removing plug G, and without liability to clog by any substance whatever.

Cover H is composed of two pieces, with a half-circle cut in one edge of each for the passage of the smoke-pipe $a$, and when placed in position, as in Figs. 2 and 3, they meet in the center and cover the cooker entire, except a small space about the pipe to prevent it from taking fire.

$b$ is a hearth beneath the door $d$, and attached to body B, for the usual purpose.

It will be observed that the plates C may be made of either wood or metal, with slots in their edges, through which fluid will pass freely, and by filling the receptacle B nearly full the fluid surrounds the fire-box and smoke-pipe, so as to utilize nearly all the heating-surface, and when cooking solids the chamber I is nearly filled with filtered fluid, which, when heated, is forced up through slots $c$, and the solids to the surface, while the cooler fluids pass down and fill the vacuum, and thus is maintained a circulation by which the food is rapidly cooked, and is not liable to burn.

Having fully described the construction and operation of my cooker, what I claim, and desire to secure by Letters Patent, is—

In food-cookers, the body B, fire-box A, plug G, plates C, and bars D, as and for the purpose specified.

IVER E. BENDICKSON. [L. S.]

Witnesses:
  THOMAS CRANE,
  D. B. PECK.